US010855329B2

(12) United States Patent
Seller et al.

(10) Patent No.: US 10,855,329 B2
(45) Date of Patent: Dec. 1, 2020

(54) RELATIVE FREQUENCY HOPS IN LOW-POWER, WIDE-AREA NETWORK

(71) Applicant: Semtech Corporation, Camarillo, CA (US)

(72) Inventors: Olivier Bernard André Seller, Saint Soulle (FR); Nicolas Sornin, La Tronche (FR)

(73) Assignee: Semtech Corporation, Camarillo, CA (US)

( * ) Notice: Subject to any disclaimer, the term of this patent is extended or adjusted under 35 U.S.C. 154(b) by 0 days.

(21) Appl. No.: 16/437,991

(22) Filed: Jun. 11, 2019

(65) Prior Publication Data
US 2020/0007187 A1 Jan. 2, 2020

(30) Foreign Application Priority Data
Jul. 2, 2018 (EP) .................................... 18181103

(51) Int. Cl.
*H04B 1/00* (2006.01)
*H04B 1/7143* (2011.01)
*H04B 1/715* (2011.01)
*H04B 1/7156* (2011.01)

(52) U.S. Cl.
CPC ........... *H04B 1/7143* (2013.01); *H04B 1/715* (2013.01); *H04B 1/7156* (2013.01); *H04B 2001/7152* (2013.01)

(58) Field of Classification Search
CPC .......... H04B 2001/7154; H04B 1/7143; H04B 1/7156; H04B 17/382; H04W 74/085
USPC .................................. 375/132, 364
See application file for complete search history.

(56) References Cited

U.S. PATENT DOCUMENTS

| 6,009,119 A | 12/1999 | Jovanovich et al. | |
| 6,104,767 A * | 8/2000 | Atarius | H03J 7/02 375/344 |
| 7,120,416 B2 * | 10/2006 | Tomita | H03J 3/08 455/340 |

FOREIGN PATENT DOCUMENTS

| EP | 1178617 A1 | 2/2002 |
| WO | WO-92/17012 A1 | 10/1992 |
| WO | WO-99/23790 A1 | 5/1999 |

* cited by examiner

*Primary Examiner* — Khai Tran
(74) *Attorney, Agent, or Firm* — Blank Rome LLP

(57) ABSTRACT

A hopping spread-spectrum wireless network for IoT applications with mobile device that have unsynchronized local frequency references. The transmitters use hopping sequences defined in term of the relative differences of frequencies, in such a manner that a receiver can determine the hopping sequence of a transmission despite the presence of a large frequency error.

13 Claims, 5 Drawing Sheets

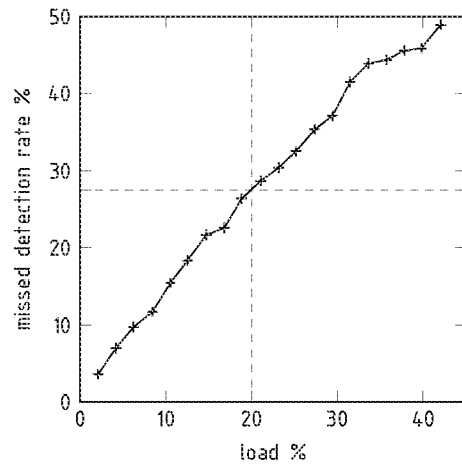
PRIOR ART          Fig. 6
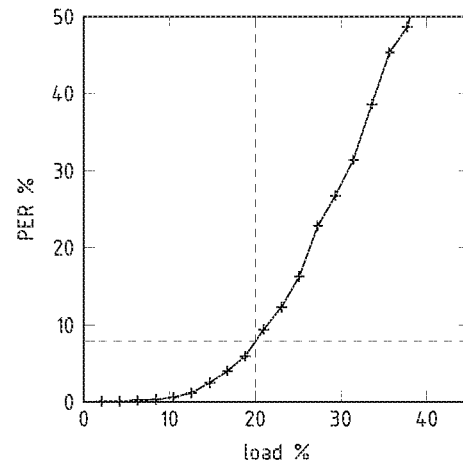
PRIOR ART          Fig. 7
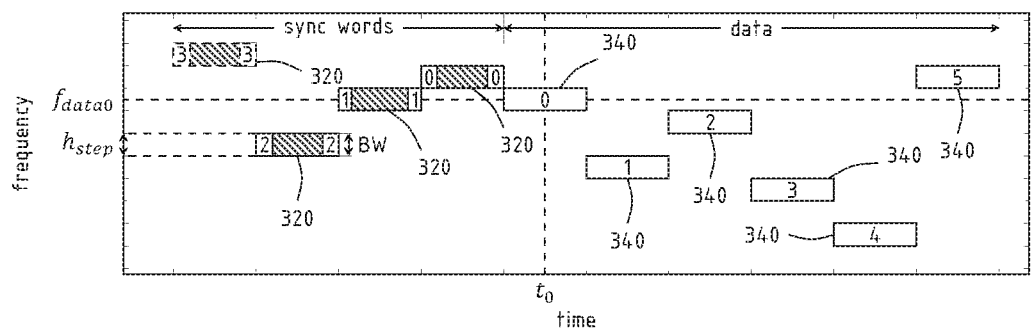
Fig. 8
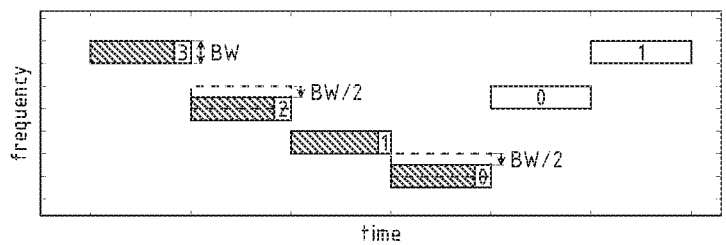
Fig. 9

RELATIVE FREQUENCY HOPS IN LOW-POWER, WIDE-AREA NETWORK

REFERENCE DATA

The present application claims priority from European patent application EP18181103.5 of Jul. 2, 2018, the contents whereof are hereby incorporated in their entirety.

FIELD OF THE INVENTION

The present invention concerns, in embodiments, a wireless transmitter device and a wireless network comprising a plurality of said transmitters. Specific use cases of the present invention relate to low-power measuring nodes for IoT (Internet-of-Things) applications and to an IoT wide-area network that includes, besides the measure nodes, a plurality of receiving gateways, but the invention is not limited to those applications. The invention makes use of narrowband frequency hopping radio interfaces for data capacity and robustness against interference.

DESCRIPTION OF RELATED ART

Several competing low-power radio networks are used to provide connectivity in IoT applications. Local Area networks, like WiFi and Bluetooth have been successfully used in some applications, but they require a local infrastructure connected to the Internet, which is not always available or desirable, and are hardly applicable to mobile applications in which the sensor nodes may move outside the accessible range of a WiFi or Bluetooth gateway. Wide-Area networks for IoT applications have also been proposed, notably the LoRa network and the Sigfox network. There are several challenges with these networks:
  1. If, as it is often the case, the network operates in an unlicensed band, high resistance to interferences is essential,
  2. compliance with regulations must be assured The LoRa network employs chirp spread spectrum modulation and has, among its strong points: low hardware complexity, no need of accurate frequency references or timekeeping, easy synchronization, and localization. It has however some limits in capacity for low data rates.

Low power WAN tend to favour random medium access like ALOHA for the sensor nodes, this being the most power efficient solution. The Sigfox technology and ultra-narrowband technologies in general, suffer from a very high collision rate compared to system load. In ultra-narrowband network collisions occurs in three dimensions: time, frequency, and power. The time dimension is the usual ALOHA theory dimension. Frequency collisions occur because there is no frequency grid; the local oscillators of the sensor nodes are much less accurate than the transmission bandwidth, and they cause a doubling of the collision rate for the same system load. The power dimension means that a marginal sensor node or a "weak node" will always lose in any collision. In addition, the phase noise of the transmitter limits the rejection level that is achievable by adjacent users.

Altogether, if a metric of weakest nodes performance is monitored, these effects limit the system load to 1% or less. This situation cannot be remedied by the simple expedient of adding more receiving gateways.

The present invention proposes a novel transmitter device and a corresponding wireless network that implement a modified form of ultra-narrowband modulation allowing overcoming or mitigating the above limitations.

BRIEF SUMMARY OF THE INVENTION

According to the invention, these aims are achieved by means of the object of the appended claims.

BRIEF DESCRIPTION OF THE DRAWINGS

The invention will be better understood with the aid of the description of an embodiment given by way of example and illustrated by the figures, in which:

FIGS. 6 and 7 plot the missed detection rate in an ALOHA network, regardless of whether it includes the feature of the invention, and the packet error rate as functions of the network load.

FIG. 8 shows a spread-spectrum transmission a preamble and a data section, each split into a plurality of frequency hops.

FIG. 9 illustrates an embodiment in which some frequency hops are shifted by a fraction of the nominal step.

DETAILED DESCRIPTION OF POSSIBLE EMBODIMENTS OF THE INVENTION

Figure 1:
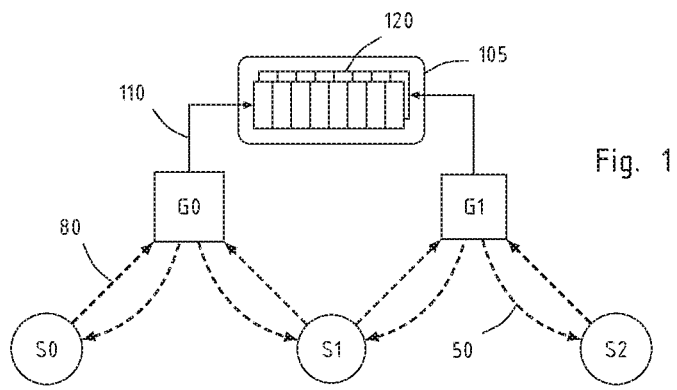
FIG. 1 is a simplified representation of a wide area low-power network including sensor nodes and gateways according to the invention.

FIG. 1 shows, in simplified fashion, a low-power wireless network that includes many sensor nodes S0, S2 and receiving gateways G0, G1. In a typical IoT application, the sensor nodes S0, S1, S2 will be simple battery-powered devices that acquire or compute data and upload them (for ex., arrow 80) to the gateways G0, G1. Although not essential, also downlink traffic (for ex., arrow 50) from the gateways to the nodes is possible.

The number of sensor nodes is not limited, and may exceed several thousands in real use cases. The number of gateways is also not bound, and is dictated by the need of covering the area in which the sensor nodes are found. Preferably, the network is designed such that each sensor is in the receiving range of at least one gateway or, preferably, several ones.

Figure 2:
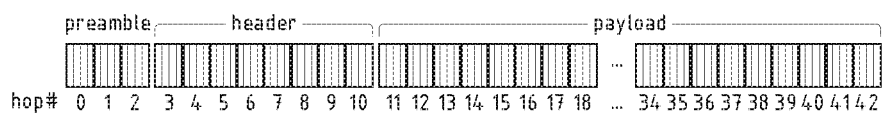
FIG. 2 schematizes a data frame used by the transmitters and receivers of the invention, the data frame comprising a plurality of frequency hops.

The uplink communications 80 between sensor nodes and gateway uses narrow bandwidth or ultra-narrow bandwidth modulation and frequency hopping spread spectrum. The modulation is preferably a form of coherent phase modulation with constant envelope, for example GMSK, MSK, or PSK. The signalling is preferably differential to accommodate channel variations. It is also preferable that the message include error-correction or error-detection codes, and that they be formatted into data frames, as illustrated in FIG. 2, each comprising several frequency hops, adjacent words in the original message are preferably interleaved at spaced-apart offsets in the frame, such that they fall into different hops, to increase robustness against momentary interferences.

The uplink communication 80 from a sensor node to a gateway includes the synthesis of a modulated radio signal that is based on a local frequency reference in the sensor node. Due to cost and power considerations, the sensor nodes cannot be equipped with high quality oscillators. Hence, the frequency of the uplink radio signal is affected by a considerable error, which may exceed the—narrow—bandwidth of the signal.

Receiving gateways, on the contrary, have considerably more computing resources than sensor nodes, continuous power, and precise time references, like for example GPS-disciplined clocks. They are preferably interconnected and can collaborate between them.

The downlink communications 50, when present, may use the same modulation protocol of the uplink ones or a different one. In order to save network capacity, downlink communication can be broadcast, to be received by all the sensor nodes within range of a gateway, but point-to-point transmission are also possible. One function of downlink messages is the synchronization of the sensors' time reference with that of the gateways, which can be advantageously achieved by LoRa broadcast packets, for example.

In most IoT applications, sensor nodes have only very limited power and computing resources. Random access to the radio channel, meaning that whenever a sensor node needs to send a message, it sends it without signalling its intention or listening whether the channel is free, are therefore advantageous. These protocols, also known as ALOHA protocols, are sensitive to inter-system collisions: the capacity of ALOHA protocols is limited by such collisions.

The devices and system of the invention use frequency hopping as a defence against collisions and other interferences. The transmitters of the sensor nodes switch the carrier frequency among several hopping frequencies in the available radio band, according to a sequence, such that the uplink transmission 80 comprises a series of successive hops with different carrier frequencies. The frequency changes at each hop boundary. Preferably the hop length is considerably less than a message length: a message, or a frame consists of one or several hops.

To permit demodulation, the sequence of the hopping frequencies must be known in advance or algorithmically determinable by the receiving gateway. The system may have only one predetermined hopping sequence, and in this case, messages with different starting times would not collide in frequency, insofar their respective hopping sequences are time-shifted, or a plurality of hopping sequences among which the transmitters can choose. The latter arrangement requires that the receiving gateway has information about the hopping sequence of each individual message.

FIG. 2 illustrates an uplink data frame or message, such as it may be used in an embodiment of the present invention. The frame begins with a preamble, containing a synchronization signal that serves for detection at the receiver end and a physical header. The physical header includes information used in the receiver to predict and follow the hopping sequence: if the system foresees more than one possible sequence of hopping frequencies, the preamble contains preferably an identifier of the sequence that has been chosen for the data following in the same frame or message. Preferably, as it will be seen in the following, the physical header contains an element of information, implicit or explicit, on the absolute value of the frequency in the first hop, or in one determined hop. Such information is used by the receiving gateway to resolve the frequency error of the transmitter.

The preamble can include also other information on the format of the data, for example an indication of data rate, the modulation scheme used, and so on.

To prevent preamble loss, the information is preferably repeated several times, in successive frequency hops. FIG. 2 shows a preamble containing three hops, but this is not an essential feature of the invention. Importantly, each replica of the preamble contains also a counter, or an element of information that allows the receiving gateway to identify each repetition. In this manner, even if the gateway should receive only one of the repetition, it could still synchronize with the hopping sequence.

The preamble is followed by a header that informs the receiving gateway on the nature and the format of the following payload. Importantly, header and payload are interleaved and coded for error correction. In the example, the header and the payload comprise eight, respectively 32 hops, but these numbers may vary according to the use cases. Each hop contains a given number modulation symbols, and a corresponding number of bits of the modulated message.

The synchronization with the hopping sequence is particularly difficult in the system of the invention because the frequency references of the sense nodes local oscillators have an intrinsic error that is larger than the channel bandwidth. To quote some figures, assuming that the sensor nodes S0-S2 are equipped with low-grade crystal oscillators with an error of 30 ppm, and that the data are modulated with a bandwidth of 400 Hz in the sub-GHz ISM band, one can expect a maximum error of 30 kHz in defining a carrier frequency. This is 80 times the modulation bandwidth.

Two possible manners of proceeding are:
1. Before a transmission, synchronize the sensor's reference with the gateway one in a downlink.
2. Arrange the hopping sequences and the available frequencies such that frequency synchronization errors can be corrected and accommodated.

Sub-bands and Channelization

Preferably, the system divides the available radio spectrum in sub-bands, which may be adjacent or separated, and each sub-band in a series of contiguous channels. Hopping can occur within a sub-band or across sub-bands. Any given frame is transmitted in a given channel in a sub-band and, since the frequencies synthesized in the sense node are not straightforwardly related with those measured by a precise reference, it is convenient to define its frequency by one sub-band index and one channel index inside the sub-band designated by the sub-band index.

The use of several sub-bands is advantageous in many respects.
1. Higher spread in the frequency domain gives better coexistence in unlicensed bands, both as a victim and as an aggressor. The regulatory limits are simpler to meet and may allow more power and/or longer transmit times.
2. Higher diversity vs propagation/fast fading.

3. Implicit signalling from the position of the first hopping frequency: the first hopping frequency in the hopping sequence may be chosen among a number of possible alternative start frequencies and, by this choice, the transmitter transmits an element of information.
4. Network planning and/or adaptive data rate.

Due to the frequency mismatch between receiver and transmitter, it is useful to define these bands differently at the receiver and at the transmitter. We introduce three notions: nominal, or regulatory, sub-band definition, receiver sub-band definition, and transmitter sub-band definition.

If the transmitter has the possibility of choosing between several possible hopping sequences, the selected one can be signalled implicitly through the choice of the first used frequency.

The selection of a hopping sequence may be based on a synchronization state of the frequency reference of the transmitting device.

Figure 3:
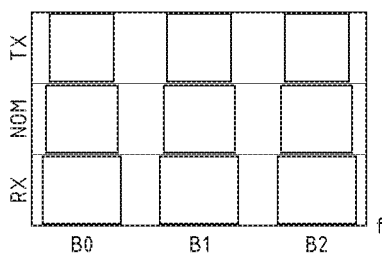
FIG. 3 shows a subdivision of the useful radio spectrum in sub-bands at the transmitter's and receiver's ends.

FIG. 3 illustrates the three sub-band definitions. In this example, the available radio spectrum comprises three disjoint sub-bands: B0, B1, and B3 of equal width and regularly spaced in this example, but this is not an essential feature of the invention: the number, width and spacing of the sub-bands are arbitrary and they might touch or overlap, according to the implementation; they might correspond to regulatory distinct region of the electromagnetic spectrum, but this is not essential. The nominal sub-bands (NOM row) are the boundaries of frequency, measured by an exact instrument, within which the transmission should be contained. The transmission (TX) sub-bands are expressed in terms of frequency as determined by the transmitter's frequency reference, i.e. they shift when the local oscillator shifts. To respect the nominal sub-band boundaries, the sensor node adjusts the transmitter sub-bands, reducing them such that, even considering the frequency mismatch, the radio signal falls always in the nominal limits.

Importantly, the sensor nodes have a synchronization status that provides an indication of the frequency error of the local oscillator. And adapts the width and/or the structure of the sub-bands dependent from the synchronization status. Several strategies might be devised but, a general principle is that, the higher the frequency error indicated by the synchronization status, the narrower will the adjusted sub-band be.

The synchronization status may be obtained from the nominal error of the local frequency reference, from a drift model that may also include the crystal's temperature, from the result of a synchronization following a downlink, from the time elapsed since the last downlink that ensued in a synchronization, or from a combination of all or some of these elements. Preferably, the synchronization status is dynamical: a given sensor node may be able to use most of the available band shortly after a synchronization, and will progressively narrow its transmission sub-band while the frequency of its local oscillator becomes less and less precise. The initial bandwidth can be restored by a further synchronization, triggered by a request of the node or following a predetermined schedule.

Often, the receiver is a gateway that has access to a GPS-synchronized clock. In this case, the sub-bands at the receiver (RX) could be essentially the same as the nominal ones. In the cases where the receiver is badly synchronized (for example in a narrow-band downlink transmission, or when GPS synchronization is at failure) the receiver may tune to a wider set of frequencies, as shown, so that it can receive all the transmission that are effectively within the nominal sub-band.

Figure 4:
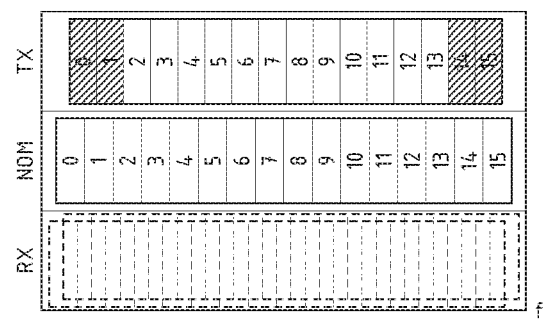
FIG. 4 shows a possible subdivision of a sub-band in channels.

The same distinction between nominal or regulatory, receiver and transmitter frequencies is carried also in the channel plan, as shown in FIG. 4. One nominal sub-band as defined above may divided in a suitable number of channels (the drawing shows only a reduced number). The same sub-band, as defined for the transmitter, will be slightly narrower due to the adjustment above, and is divided in the same number of channels. Due to the frequency mismatch, however, the channel defined for the transmitter do not correspond exactly to the nominal ones. The transmitter may exclude some channels, for example those close to a sub-band boundary (darkened in FIG. 4) to ensure that all its transmission fall within the nominal sub-band. Preferably, all the transmitter in a network use the same reduced sub-set of available frequencies to limit the signalling of hopping sequence choice.

In a hopping sequence, each hop is transmitted on a different carrier frequency that can be designated by a sub-band index and, inside the sub-band, a channel index. Preferably the sub-band are designed such that the correspondence between transmitter, nominal, and receiver is unequivocal, i.e. a carrier that lies for the transmitter (TX) in a given sub-band, will be the same sub-band for the receiver irrespective of the synchronization status, because the separations between the sub-bands are larger than the maximum expected frequency error. This is not the case for the channel, however, and the correspondence between the channel index chosen by the transmitter and the actual frequency perceived by the receiver is not straightforward.

The available frequency band in these embodiments may be channelized into a plurality of transmission channels. Preferably the channels do not overlap, but this is not an absolute requirement. The frequency band may be split in sub-bands, each comprising a plurality of channels, or else all the channels may be comprised in one common division. In general each hopping frequency may be designated by a channel index and, possibly, a sub-band index.

The transmitters of the invention may be arranged to determine the hopping sequence by incrementing repeatedly a channel of an initial hopping frequency according to a determined succession of increments, thereby obtaining a sequence of channels, each channel in the sequence defining a hop. Preferably, the increment is followed by a modulo operation to maintain the hopping frequencies within predetermined limits.

Thus, the hopping sequence is defined in terms of relative intervals, and the transmitter can choose freely the initial frequency. Insofar as the frequency (or equivalently the channel) of a given hop is derivable from that of the previous one by an offset, or shift, followed by a modulo operation, the sequences define only the relative frequency shifts or intervals associated to each hop, without constraining the first channel from which the sequence starts. When the shift operation yields a channel that is outside the bounds of its sub-band, the modulo operation wraps it inside the sub-band.

In reception, once the receiver detects a signal at an initial frequency (or channel) it can forecast the hopping frequencies by incrementing repeatedly the initial frequency according to the known succession of increments and tune in succession in the hopping frequency to receive the entire message.

The offset does not depend on the used frequency, but may depends on the hop index, for example, it may be linearly increasing, or it may result from a pseudorandom sequence or permutation, known or algorithmically reproducible to the receiver.

Implicit and Explicit Signalling of the Hopping Sequence

The communication network of the invention may use one common hopping sequence for all the uplink transmission or, preferably, a plurality of hopping sequences among which the transmitting node can choose. When several hopping sequences are possible, the sequence of each message is signalled explicitly or implicitly in the physical header or preamble.

The hopping sequence is determined by the channel index and sub band index of the first hop and, if necessary, a hopping sequence index. The transmitter side synthesizes a radio signal that has a well-determined frequency relative to its own time reference but, since this reference has an undetermined error, the frequency received by the receiver is undetermined.

The receiving gateway can determine with certainty the sub-band index of the first hop, insofar as the sub-bands are sufficiently separated, and knows also the hopping sequence index, because this information is explicitly signalled in the header, but it cannot determine with certainty the channel index chosen by the transmitter for the first hop and, consequently, cannot determine exactly the further development of the hopping sequence. This is particularly true when the frequency folds about a sub-band boundary.

To solve this problem, the transmitter may have a stable frequency reference, such as a TCXO, and synchronizes its frequency from a downlink frame or beacon. In this case, the accuracy can be better than one-half or even one quarter of the modulation bandwidth. It is then possible to define channels, and hopping sequences are defined without ambiguity. This solution however may not be practicable in IoT application, due to cost and power budget limitations.

In another possible embodiment, the transmitter has a less stable frequency, for example, a low-grade XO, but its error is at least characterized and comprised within known limits. This may include synchronizing the transmitter's frequency reference with the gateway's one, by means of a downlink frame or beacon. In that case, the error may reach 1 ppm, which corresponds to about than 1 kHz in the 868 MHz or 915 MHz ISM bands.

To allow the receiver to determinate the sequence of hopping frequencies, despite the frequency error, the transmitter sends out additional information on the channel used for the first hop, or for one determined hop of the sequence, for example the first data hop after the preamble.

In a simple explicit signalling scheme, the transmitter may include in the preamble the full designation of the channel or of the carrier frequency used for the first hop, or for the following hops in the preamble. From this, the receiving node can gauge the instantaneous frequency mismatch between the transmitter and itself, and determine the hopping sequence.

Signalling the channel index in full may be wasteful, however, because the frequency error is not arbitrarily large. The receiving gateway can usually determine the channel of a transmission with an uncertainty of some units from its absolute frequency. For example, if the maximum frequency error corresponds of ±1.5 times the modulation bandwidth, the receiver needs only two bits of information to determine the channel index. The preamble contains a partial information, for example the two least significant bits of the channel index, and the more significant bits are determined by the receiver based on the absolute carrier frequency. Preferably, at least a significant portion of a channel index designating the first hopping frequency is signalled, either explicitly or, as it will be shown further on, implicitly by the choice of the frequency of the first hop.

In a possible variant of the invention, the information on the initial channel is not explicitly modulated in the preamble or anywhere in the message, but it is implicitly signalled by the choice of the frequency of the first hop. The hopping sequence being defined in terms of relative intervals, the transmitter can choose freely the frequency of the first hop, and, by this choice, implicitly signal the channel chosen for the first hop of the hopping sequence. Referring to the sub-band plan of FIG. 3, for example, 1.5bits of information can be implicitly transmitted with the choice of B0, B1, or B2 for the first hop. The convention may be that B0 is used if frequency index equals 0 modulo 3, B1 if it equals 1, and B2 if it equals 2. Since the sub-band can be detected without ambiguity, the receiver is capable of reconstructing immediately the hopping sequence.

Figure 5:
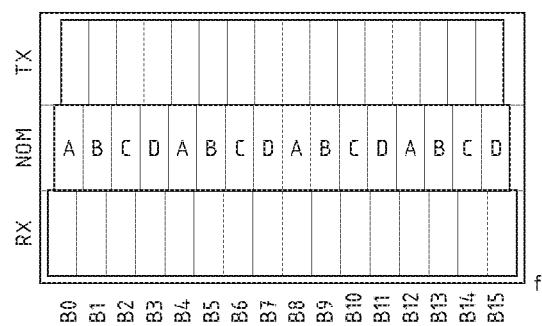
FIG. 5 shows a frequency plan with contiguous sub-bands.

FIG. 5 illustrates a frequency plan that is not partitioned in disjoint sub-band. This avoids guard bands between the sub-bands and maximizes the spectral efficiency. The frequency span is split into contiguous sub-bands, grouped in different sets, marked A/B/C/D, to create groups of disjoint sub-bands. For this, the frequency distance between 2 sub-bands of the same group (in the figure A-A, B-B, C-C, or D-D) should be higher than the maximum transmit frequency error of the end-points.

Disjoint sub-bands can then allow the use of implicit signalling of the frequency of the first hop. The groups may be used for network planning, whereby a given gateway will be assigned a given group, therefore the received sub-band will not be ambiguous. In alternative, the groups may be used to separate traffic on the ground of data rate; again, the sub-band index of first hop is not ambiguous as the data rate is signalled in the header of the frame.

Independently of the use of implicit signalling, dividing the band into groups of sub-bands can also be used to separate uplink traffic between users received with high power and users received with low power, to protect the weakest users. Because of frequency errors, there would still be some collisions on the edges of the sub-bands, but less than with hopping sequences defined over the entire band.

Collision Prediction and Blanking

Since the system is based on frequency hopping, insofar as the hopping sequence is known, the receivers have the possibility to forecast if and when two messages will collide. The preamble and synchronization portion of frames cannot be predicted beforehand, but the data can be post-processed after a short delay. Since the frames are FEC encoded and interleaved over all the hops, the receiver should wait for the last hop before de-interleaving and decoding, at which time the collision prediction and blanking process of the frame of interest is complete. Therefore, the blanking process does not delay the decoding process.

In a preferred embodiment, the prediction includes the building, in a receiving gateway, of an interference map forecasting the received signal level as a function of time and frequency. On the time axis, the map resolution, or granularity, is preferably equal or better than a length of a symbol and can have a resolution equal to one sample.

The receiving gateway, when a signal is detected, determines its hopping sequence and fill the bins of the interference map corresponding to the expected time and frequency of the coming packets with the signal level measured in the detection step (one power level per each packet).

The wording "signal level" denotes here any suitable indicator of intensity or power including, but not limited to, the measured received signal strength, or RSSI measured in dBmW, in dBµV/m, or in any suitable scale or unit.

The operation is as follows:
1. The receiver instantiates one demodulator per each detected frame. The demodulators generate log likelihood ratios (LLR) for each received bit and possibly some quality indicator like a RSSI, SNR or other.
2. As the detection and the demodulator instances progress, they update an interference map by adding the measured relative signal strength of the signal of interest (RSSI). Such interference map shows the possible cross-interferences of all the nodes that are transmitting at a given time and should have at least a time granularity of one symbol length and a frequency granularity better than the modulation bandwidth.
3. Once a frame reaches the end of demodulation, and before de-interleaving and decoding, the LLR are weighted and possibly blanked based on the interference map: for each received bit, interference-plus-noise ratio (SINR) is computed. Where the interference map shows a simultaneous transmission in time and frequency from two nodes, the LLR are weighted by a corrective factor, usually between one and zero, to account for the fact that the signal in these time and frequency slots is potentially corrupted by interference. Blanking amounts to assigning a weight of 0. The amount of weighting or, possibly, total blanking is determined based on the signal to interference-plus-noise ratios (SINR).

Preferably the receiver gateway is arranged to measure the signal level of a plurality the packets in a hopping sequence of a radio signal that are free from interference and, if the signal level of a source changes during the reception changes, can adjust the signal level of the foreseen packets in the interference map.

In another preferred variant, the receiving gateway should assess also interferences coming from other systems, by comparing the signal received with those forecast from the interference map.

Collaborative Reception

The message transmitted from one sensor node may be received by more than one gateway and in this case, several receivers can collaborate in its decoding. Referring to FIG. 1, the message transmitted from S1 is received both by G0 and G1. For each frame, the receiving gateways G0, G1 transmit the necessary information to a server 105 (which could be in a separate location, or in the same place as one of the gateways; a separate piece or hardware, or merely an instance of a software program) The information uploaded (arrow 110) to the server preferably includes the weighted LLR as computed previously, along with time of arrival information, hopping information, and other metadata which will be used to identify and process the frame. Preferably, the receiver can provide an accurate estimation of the intended transmission frequency. This simplifies the identification of frames in the server 105. Implicit signalling can be used to this purpose.

Multiple Sync Words (Hopping Preamble)

ALOHA networks may use a special sequence of data, conventionally indicated as a "sync word", to identify the start of a transmission, or of a frame of data. Sync words may be placed in the preamble or physical header of a frame and their structure is sufficiently known by the receiver to allow detection and word alignment.

Sync words and physical header are particularly important because, if they are misunderstood, the reception of all the subsequent data is compromised. FIG. 6 shows the expected error rate in the detection of the sync word of the preamble, simulated for system self-interference in an ALOHA network with increasing load, under the assumption that the sync word is missed when more than 20% of its duration is covered by an interference. The preamble is not protected by FEC and interleaving, which intervene at higher level, and the error rate at 20% load is around 28%. To compare, FIG. 7 plots the predicted error rate (PER) for the payload for the same network of FIG. 6, assuming convolutional FEC (133, 171, k=7) and that 80% of the interference is detected and blanked before decoding and 20% is not, which are realistic assumptions for a weak node. We see that the PER at 20% load is around 8%.

In an embodiment, the sync word, and possibly the physical header as well, are transmitted in several copies at different frequencies, following the hopping sequence. Each repetition of the sync word is combined with an element of information on the hopping index, for example a counter that allows the receiver to align to the hopping sequence. FIG. 8 shows a possible implementation of this multiple header transmission. The pilot represents an uplink transmission that comprises a time succession of several hops, having different carrier frequencies, and appear at different ordinates in the plot. Every individual hop, represented by an empty or filled rectangle comprises a narrow-band modulated signal.

Preamble hops 320 contain a plurality of sync words, each combined with at least one hopping index, which is in this embodiment repeated in two copies at the beginning and at the end of each hop. This is not essential, and the index could be only at the beginning, or at the end, or in the middle but, since most interferences are limited to a short time interval, this additional redundancy increases the robustness.

In a possible realization, the hopping indexes are arranged in a countdown decreasing sequence: the hop labelled with '0' being the last of the preamble hops. This arrangement is flexible in that the receiving gateway needs not know how many hops the preamble consists of, the number of sync words, or their repetition rate. The receiver needs only receive correctly one hop to synchronize and align with the hopping sequence, factoring the frequency error of the transmitter in, and know the position at which the sync word end and data start. For example, even if the first sync word (dashed) were not be sent at all, the receiver could still synchronize on any of the following ones.

The number and the repetition rate of sync words 320 need not be fixed, but could be modified dynamically by the transmitter based on contingent factors. In a preferred embodiment, the transmitter adapts the sync word repetition number and/or sync word repetition rate based on a synchronization status that is indicative of the frequency error of its local frequency reference.

In another embodiment, the number of repeated sync words and/or the sync word repetition rate is adapted by the transmitter based on an estimation of the transmitter success rate. The transmitter success rate is the probability that a transmission is correctly received by the gateway or by the gateways. It depends on network load, and on the reception signal level seen by the gateway. The success rate depends also on the number of sync words, as mentioned above: the more the sync words, the higher the probability of success. The dependence from the number of sync words is particularly steep when the system capacity is limited by its own traffic.

The transmitter can estimate the success rate in several ways. An accurate method of estimating the success rate is based on the fraction of transmitted frames that should be acknowledged by the network and are in fact acknowledged. Less accurate methods that do not require acknowledgements include estimating the load on the channel, by sampling the channel for signal level only, or by attempting to detect sync words from other transmitters, and computing the success rate from the channel load.

In another embodiment, the transmitter adapts the sync word repetition number and/or the sync word repetition rate based on a command received on the network. The network infrastructure, for example a gateway or a server, can estimate the success rate for a given transmitter. A possible manner of doing that require inserting a frame counter that increments at each transmission, so that success rate can be directly monitored. The network may also estimate statistically the success rate of a given transmitter when it transmits few frames, from system load, transmitter received signal level, and other transmitters received signal levels. The network can then make a trade-off of performance/power consumption/network load by adjusting individually the sync word repetition number/rates. The network may define different classes of service and apply different policies to these classes.

The data hops 340 are numbered on the plot to distinguish them, but need not include an explicit index. The receiver at this point has already determined their frequencies and can demodulate them normally. Since the data are FEC-encoded and interleaved, the transmission is highly immune from interferences. Conventionally, the hopping sequence is defined in relation to the centre time t_0 and the centre frequency f_data0 of the first data hop. Other choices may be possible, however. It is a distinctive feature of the invention that both preamble and data in a frame span each over a plurality of frequency hops.

As discussed above, the hopping sequence involves a series of carrier frequencies centred in non-overlapping channels (FIG. 4). In a possible embodiment, the transmitter node is arranged to offset the carrier frequency of some preamble hops by a fraction of the bandwidth, as illustrated in FIG. 9. In this arrangement, even sync words are down-shifted by one-half of their bandwidth. In general, the frequency hops may be separated by frequency offsets that are integer or half-integer multiples of the bandwidth, or multiple of a predetermined fraction of the bandwidth.

Although this shift seems to increase the likelihood of collision in frequency, it is in fact useful because in general the central frequencies of the channels used by the transmitter is not well defined. The modulation bandwidth is low, about 100 Hz and, to detect any sync word, the receiver needs to form a large number of channel, or increase their bandwidth.

Thanks to the shift of FIG. 9, the receiver can form less channels or reduce their bandwidth, and still be able to detect at least a part of the sync words with high likelihood, If half sync words are offset by BW/2, the receiver is sure that at half of sync words will have an offset lower than BW/4. In this manner one trades off some robustness or performance (more repetition of the sync word may be needed) for a lower complexity in the receiver.

Importantly, the sequence of integer and fractional steps follows a deterministic rule such that the receiver can apply these deterministic fractional shifts to the nominal sequence of hopping frequencies and keep exact tuning, insofar as the position in the sequence of shift words is known. As already mentioned, in the example of FIG. 9 even-index sync words are shifted downwards by BW/2. Other deterministic rules can be used to the same effect.

While it is sufficient for the working of the invention that the sync words be detectable and recognizable by the receiver, known techniques can be used to choose sync words with advantageous properties, for example a sharp autocorrelation. Among these choices, the invention can use the same sync word in all the preamble hops 320, or also different sync words for each hop, according to a predetermined known sequence. In the latter case, the receiver could determine the position of the hop from the hopping index and/or from the sync word itself.

The preamble hops 320 may transmit additional information to the receiver beside the sync words. For example, they could include additional information designating a data rate for the data portion and/or an indication designating a hopping sequence among a plurality of possible hopping sequences. These elements of information could be encoded in any suitable manner.

Hopping Sequences

As already stated, the frequency errors in the transmitter nodes makes it difficult to define a hopping sequence. Preferably, the hopping sequence for the hopping preamble, and possibly for at the beginning of the data part, should be such that it can be identified from the index and current frequency only. In addition, since the transmitted frequency can show errors higher than several times the channel bandwidth, the hopping sequence determination should not be impacted by such an offset.

Assuming a continuous set of potential frequencies, an advantageous option is that the hopping sequence is defined in terms of relative intervals, the transmitter being capable of choosing freely the initial frequency. As already mentioned, this means that, in the hopping sequence, the frequency of a given hop is derivable from that of the previous one by an offset followed by a modulo operation, to keep it within the intended band limits.

As far as hopping preamble is concerned, all frequencies are relative to the centre frequency of the first data hop, that we denote f_data0. This frequency must be comprised between the limits of the band, or of the sub-band, denoted as f_min and f_max.

We define the minimum hopping step as h_step. To simplify the description and figures, we assume that h_step be equal to the modulation bandwidth BW (for example measured at the 6 dB cutoff). This is not a necessary requirement, however. The transmitted signal will be (with a 6 dB cut-off) between f_min−bw/2−f_error_max and f_max+bw/2+f_error_max.

We denote with N the number of channels available for hopping from the point of view of a transmitter, N=floor (f_max−f_min)/(h_step+1).

From the point of view of the receiver, the total set of centre frequencies that should be scanned spans from f_min−f_error_max to f_max+f_error_max, where f_error_max denotes the maximum frequency error for a transmitter, which is a consequence of its crystal oscillator error.

To simplify the notation, we force f_data_0 to be such that f_data_0=f_idx_data_0*h_step+f_min, with f_idx_data0 an integer between 0 and N. In this way, we can simply identify a frequency to an integer. We only require that the frequency differences are an integer number of h_step. This can be extended to the general case.

When several hopping sequences are defined, we note hop_seq_idx the identification of the hopping sequence. Then, we can describe the frequency versus index and hop_seq_idx. Remember index is the hopping preamble index, which counts down:

1. If index=0, f_idx_preamb(index)=mod(f_idx_data_0+ hop_delta(0,hop_seq_idx),N+1)
2. If index>0, f_idx_preamb(index)=mod(f_idx_preamb (index−1)+hop_delta(index,hop_seq_idx),N+1)

Figure 10:
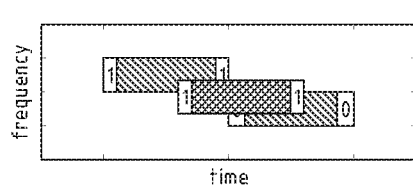
FIGS. 10-13 illustrate repeated collisions in the preamble, under different assumptions.
Figure 11:
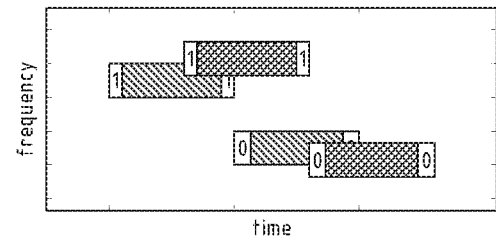
Figure 12:
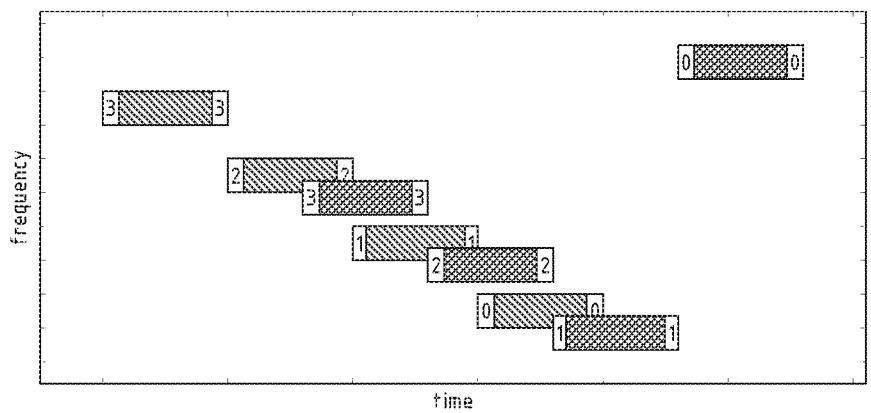
Figure 13:
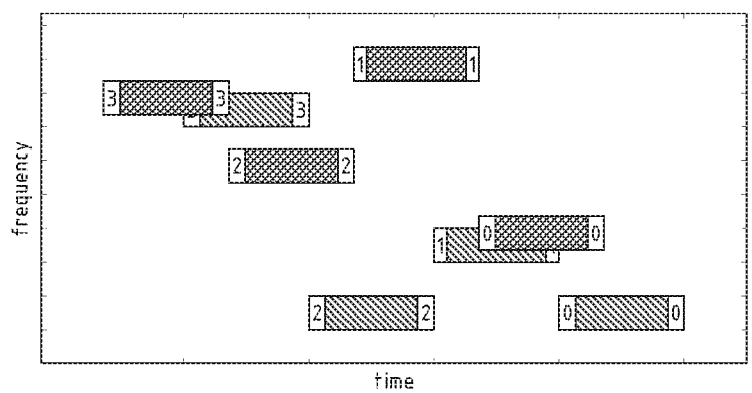

The series hop_delta should be chosen to minimize repeated collisions, especially in the preamble hops: if two transmitters happen to collide on one hop of the hopping preamble, they should collide as little as possible on the other hops. Ideally, if they are to collide on a given hop, they should not collide on others. The following properties are important to ensure multiple collisions are limited:

1. hop deltas equal to ±1 should be eschewed. Algebraically: for any index and any hop_seq_idx, the inequality abs(hop_delta(index,hop_seq_idx))>1 should hold. This is because the center frequencies are not well defined because of frequency error, so with an offset of only 1, collision could occur on 2 consecutive hops, as shown in FIG. 10. The exact rule, if BW≠h_step is: abs(hop_delta(index,hop_seq_idx))*h_step>BW+abs (hop_offset).
2. The values of hop_delta should be different, otherwise multiple collisions surely occur as soon as one occurs. This is illustrated on FIG. 12.
3. The difference between hopping deltas should be at least 2, because of frequency errors. This is shown on FIG. 11 with hopping deltas of 2 and 3.
4. For any index and any hop_seq_idx, hop_delta(index, hop_seq_idx)) should be different than any sum of consecutive hop deltas. This is illustrated on FIG. 13. The exact rule would be sum of consecutive hops plus or minus 1, but as per rule 3 differences are multiple of 2 anyway.

To satisfy the first 3 rules, the hop_delta sequence can be simply the odd integers or the even integers. To respect also the 4th rule, assuming the maximum number of sync words is 4 within a hopping preamble, 4 different sequences, these can be {2,4,8,10},{14,16,20,22},{-2,-4,-8,-10},{-14,-16,-20,-22}

Simulations have shown that the above rules improve significantly the probability of correctly detecting the preamble and reconstructing the hopping sequence, despite the frequency error in the transmitter.

Different Hopping Sequences Options

Pseudo random hopping sequences offer better resistance to system self-interference, bringing more diversity against collisions. Preferably, the pseudo random hopping sequences are still bijective from one hop to another: the frequency of each hop is deterministically derivable form the frequency of the preceding one. A possible, but not unique, manner to obtain this feature is to arrange the frequencies of the hops according to a deterministic sequence of permutations.

Thanks to the bijective correspondence above, the receiver needs only to detect one hop to reconstruct the sequence of hopping frequencies by himself.

The issue with general pseudo random sequences is that they require an exact knowledge of channel. Two options to alleviate this issue exist:

The transmitter has a stable frequency reference, such as a TCXO, and synchronizes its frequency from a downlink frame or beacon. In this case, the accuracy can be better than one-half or even one quarter of the modulation bandwidth. It is then possible to define channels, and hopping sequences are defined as per the state of the art.

The transmitter has a less stable frequency, but does synchronize its frequency from a downlink frame or beacon. In that case, the error may reach 1 PPM, which leaves less than 1 KHz in the 868 MHz or 915 MHz ISM band. Then as side information, as described here within hopping preamble or using a different way, the transmitter can signal the frequency it aims its transmission on. This way, the receiver knows the frequency error of the transmitter and can derive the hopping sequence. Thanks to the limited frequency error, only 2 or 3 bits are enough as side information: the error is lower than +/−1.5 channels, and what matters is then mod(f_idx_preamb,4). The hop_offset can be adjusted so that the maximum frequency error in this case is limited to +/−1.5 channels, or other values so as to limit the required side information.

Preferably the hopping sequence is unambiguously derivable from the nominal carrier frequency or the channel index of its first hop or, equivalently, of one hop at a determined position in the detection preamble, possibly with additional side information, despite a frequency error that may be several times greater than the channel bandwidth.

Figure 14:
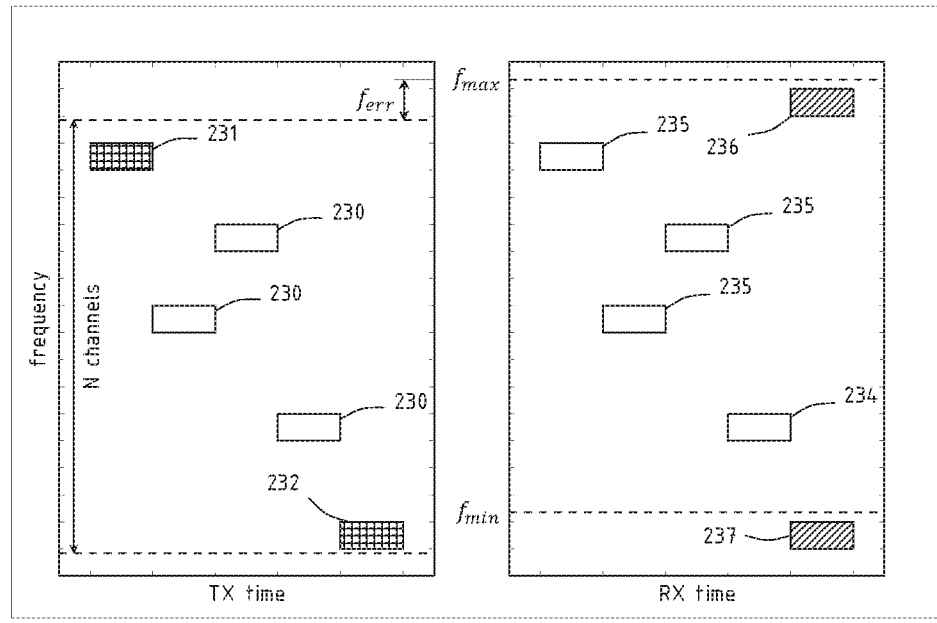
FIG. 14 shows a mechanism of compensating a frequency error of the transmitter, in a hopping spread-spectrum transmission.

To address this problem, the invention relies on hopping sequences that are defined in term of relative shifts followed by a modulo operation. For some hops whose frequency is close to the boundary of a band, or of a sub-band, the receiving gateway may be unable to know whether the transmitter has judged that they fall outside the band limits, and whether the modulo operation has been applied or not. In other words, there is an ambiguity between channel index k and channel index k+N. FIG. 14 illustrates this case. The two plots represent a same hopping sequence, as transmitted by the transmitting node and received by the gateway. The frequency axis is relative to the time base of the gateway, conventionally considered as exact, and the received hops are horizontally aligned with the transmitted ones.

In reality, the transmitter node will synthesize the frequencies based on its own frequency reference, which is affected by the error f_err and, dependent of this unknown quantity, may fail to apply the modulo operation to hop 232 or, should the error be reversed in sign, apply it to the hop 231. There is therefore an ambiguity in that some hopping frequencies may be synthesized at two distinct frequencies according to whether the increment resulted in a frequency judged outside of the sub-band limits by the transmitter.

To cope with this ambiguity, the receiver may open a second listening channel for the hops that are expected to fall close to a boundary. For example, when the prescribed offset is applied to the hop 234, the receiving gateway finds that the next hop 237 would fall beyond f_min, and should then apply a modulo operation and listen for the next hop at the position marked 236. Nevertheless, the gateway opens a second receiver at the unwrapped position 237. In this manner, either of the receivers will be correctly tuned. In an alternative embodiment, the transmitter may omit to transmit hops like 231 and 232 that are closer than f_err_max to a boundary.

In an embodiment, hopping sequences are generated by a permutation on each hop. Each hopping frequency is derivable by a preceding frequency in the hopping sequence (typically, the immediately preceding one) by a permutation operation. This way, there is one permutation per starting frequency. There must be a different permutation per hop, otherwise only one sequence will be generated Preferably, the sensor node implicitly signals the hopping sequence through the starting frequency (that we also call first data hop frequency, or reference frequency). The sequence is the following, also described iteratively:

If index=0, f_idx_data(index)=f_idx_data_0

If index>0, f_idx_data(index, hop_seq_idx)=hopping_ perm[hop_seq_idx](f_idx_data (index-1))

Where hopping_perm[hop_seq_idx] is a permutation of (0,N−1), preferably cycle less.

The performance gain comes at a price: the receiver has to know the exact intended frequency of the first hop, to derive the sequence. As already described, this may be obtained by a stable frequency reference in the transmitter, or by implicit or explicit signalling of the absolute frequency of any hop, preferably the first one, as synthesized based on the transmitter's own frequency reference.

The value of the absolute frequency may be signalled implicitly, through the choice of the first sub-band used in the transmission, since the determination of the sub-band is never ambiguous, give the limits within which the frequency references in the mobile nodes can drift, or in any other suitable manner.

Hopping sequences for the Sub Band Case

Should the available frequency be divided into sub-bands, the transmitted hopping sequence may be designated by a sequence of sub-bands hierarchically superposed to a sequence of channels. Each hop is transmitted in a different sub-band and in a different channel as dictated by the respective sequences.

To simplify notations, we assume that all sub-band have the same number of channels equal to N+1. This way we keep the single band case notations to note the used frequency within a sub band.

The sub band index is noted sb_idx_data, it depends on hop number index, and hopping sequence number hop_seq_idx. For a given hopping sequence number, the hopping sequence only depends on sb_idx_data_0 and f_idx_data_0 i.e. the frequency of the first hop.

The hopping sequence is then defined as the sets sb_idx_data (index, hop_seq_idx, sb_idx_data_0, f_idx_data_0) and f_idx_data (index, hop_seq_idx,sb_idx_data_0, f_idx_data_0)

The organization of available frequencies as disjoint sub-bands offers advantages which are independent of hopping sequences: better diversity against multipath, better interference mitigation, better coexistence and as a consequence better alignment with regulations.

When the sub bands are disjoint, one advantage is that the sub-band of the first hop is known to the receiver without ambiguity, even when there is a frequency offset from the sensor node. We can use sb_idx_data_0 to signal both a hopping sequence and side information like the LSBs of f_idx_data_0. For instance, when there are 40 sub-bands, 2 bits can signal the LSBs of f_idx_data_0, then 10 hopping sequences can be signalled from sb_idx_data_0. Of course, more hopping sequences can still be signalled implicitly through f_idx_data_0. We could also only signal hopping sequences from sb_idx_data_0, and let the frequency error unknown, but then the received will have to open duplicated reception windows (duplicated in frequency) at band edges like in FIG. 14.

For unsynchronized nodes, the space for f_idx_data is reduced to ensure the transmissions always occur in the authorized band. Signalling the LSBs only helps in providing better hopping sequences.

Simulations have shown a certain advantage of using sub bands compared to a single band, when the frequency synchronization is imperfect. Assuming a single hopping set is used (hopping sequence is determined only by first hop), the interference mitigation is slightly better with the sub band case. However, when several sets are used, the advantage diminishes as all systems are very close to complete random sequences which are the optimum for interference mitigation.

Hopping Sequences for Sub Band Case with Perfect Frequency Synchronization

This case assumes that all sensor nodes have a frequency synchronization which is better than 3¼ of the modulation bandwidth, such that there is no ambiguity in the intended frequency.

Here the first hop frequency, defined by the couple {f_idx_data_0, sb_idx_data_0} is still used to index the hopping sequence, potentially with other indexing. They are known without ambiguity.

It is part of the state of the art to generate pseudo random sequences which depend on f_idx_data_0, sb_idx_data_0, hop_seq_idx. There should be one for the sub band index, and one for the frequency index. One example of this uses Pseudo Random Binary Sequence generators, whose state size is higher or equal to the total number of bits required to represent f_idx_data_0, sb_idx_data_0, index, hop_seq_idx.

Hopping Sequences for Sub Band Case with Mixed Frequency Synchronization Capabilities This case is more realistic, because not all sensor nodes will be equipped with good time/frequency references. Even with prior synchronization, sensor nodes may exhibit significant frequency drifts, because the beacon/synchronization frames are not very frequent in LPWAN.

Then, we need to get two populations coexist. It is preferable to give to the better-synchronized nodes a higher hopping space. Of course, it is also possible to reduce the space for all nodes, so they get the same.

Figure 15:
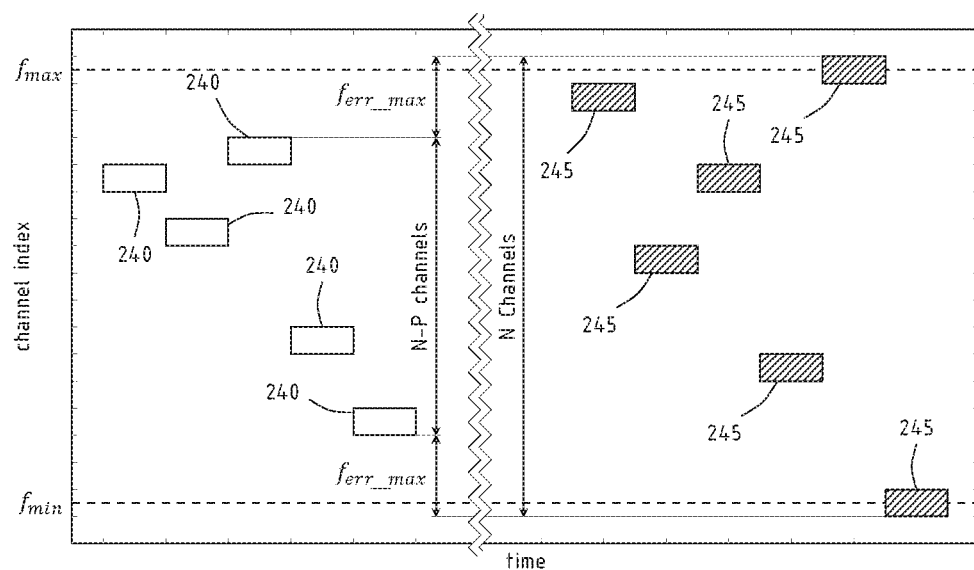
FIG. 15 compares a frequency hopping transmission by a node with a low-quality frequency reference with the same by a node with a stable frequency reference.

FIG. 15 illustrates a possible arrangement in the frame of the invention. The first hop frequency for the loosely synchronized nodes is limited and is not allowed to come nearer to the band limits than f_err_max. The transmitting node still signals the exact frequency through the first used sub band. The loosely synchronized nodes may only use the N-P middle channels (hops 240), while the well synchronized nodes may use any of the N available channels (hops 245), Please note that for each hop the sub-band index changes, but this uses a standard pseudo random hopping sequence.

Figure 16:
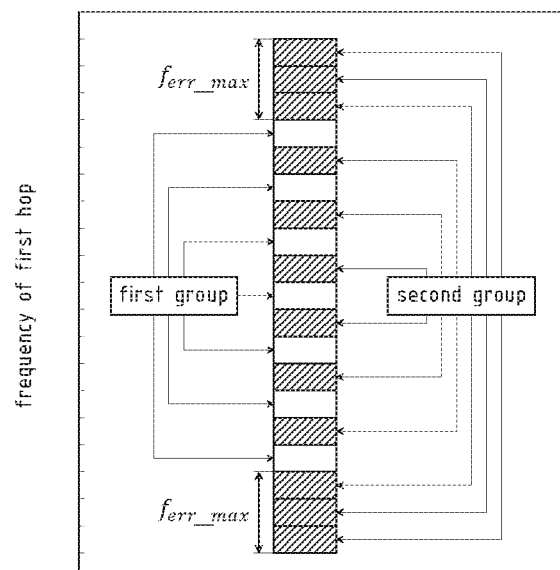
FIG. 16 relates to an embodiment in which the kind of hopping sequence is signalled by the choice of the first hop.

The signalling of which hopping set is used comes again from the first frequency index. Some frequencies in the centre may signal full span hopping sequences. The set of frequencies should be split into 2 disjoint groups, as shown in FIG. 16. First group having only frequencies in the centre, to ensure first hop of a loosely sync node is within allowed boundaries, and second group being the rest. The relative sizes of groups should depend on the proportion of loosely synchronized nodes.

The invention claimed is:

1. A wireless communication network comprising a plurality of radio transmitting devices in a frequency band that is divided into a plurality of channels, wherein,
the transmitting devices have each a local frequency reference, and are arranged to modulate a carrier and processing the modulated signals into a spread spectrum radio signal by switching a frequency of the carrier among several hopping frequencies in the frequency band according to a hopping sequence and,
the transmitters being arranged to determine the hopping sequence by incrementing repeatedly a channel of an initial hopping frequency according to a determined succession of increments, thereby obtaining a sequence of channels, each channel in the sequence defining an element of the hopping sequence, and transmit the spread spectrum radio signal through a radio interface.

2. The wireless communication network of claim 1, wherein the channels do not overlap.

3. The wireless communication network of claim 2, wherein, in the determination of the hopping sequence, the transmitter applies a modulo operation after each increment, to maintain the hopping frequencies within predetermined limits.

4. The wireless communication network of claim 1, including at least one receiving gateway arranged for: detecting a transmission from a transmitting device at an initial received frequency; forecasting the hopping frequencies by incrementing repeatedly an initial received frequency according to the determined succession of increments; receiving the spread spectrum signal at the forecast hopping frequencies.

5. The wireless communication network of claim 3, wherein the receiving gateway is arranged to determine when a hopping frequency is expected to fall close to the predetermined limits; to compute two distinct values of frequency according to whether the increment resulted in a frequency judged outside of the predetermined limits or in the predetermined limits by the transmitter, and to listen at both distinct values of frequency.

6. The wireless communication network of claim 3, wherein the transmitter device is arranged to omit the transmission of a hop whose hopping frequency falls closer to the predetermined limits than a determined threshold.

7. The wireless network of claim 1, wherein the frequency band is divided into sub-bands; the transmitters being arranged to determine a sequence of sub-bands, and to transmit each element of the hopping sequence in a sub-band defined by the sequence of sub-bands at a channel defined by the sequence of channels.

8. The wireless network of claim 1, wherein the transmitting device is arranged for selecting a hopping sequence among a plurality of possible sequences.

9. The wireless network of claim 8, wherein the selection of a hopping sequence is based on a synchronization state of the frequency reference of the transmitting device.

10. The wireless network of claim 8, wherein the hopping sequence is signalled through a first frequency of the hopping sequence.

11. The wireless network of claim 1, wherein the transmitting device is arranged for signalling a value of a hopping frequency as synthesized.

12. The wireless network of claim 11, wherein the frequency band is divided into sub-bands; the transmitters being arranged to determine a sequence of sub-bands, and to transmit each element of the hopping sequence in a sub-band defined by the sequence of sub-bands at a channel defined by the sequence of channels, wherein the value of a hopping frequency as synthesized is implicitly signalled through the choice of the first sub-band.

13. The wireless network of claim 11, wherein the value is explicitly signalled by including in spread spectrum signal modulated data designating the channel or the frequency used for the first element or for any element in the hopping sequence.

* * * * *